US012804307B2

(12) United States Patent
Qu

(10) Patent No.: US 12,804,307 B2
(45) Date of Patent: Nov. 17, 2026

(54) EARPHONE AND EARPHONE CONTROL METHOD

(71) Applicant: GOERTEK TECHNOLOGY CO., LTD., Qingdao (CN)

(72) Inventor: Zheng Qu, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 297 days.

(21) Appl. No.: 18/428,766

(22) Filed: Jan. 31, 2024

(65) Prior Publication Data

US 2024/0171896 A1 May 23, 2024

Related U.S. Application Data

(63) Continuation of application No. PCT/CN2021/138955, filed on Dec. 17, 2021.

(30) Foreign Application Priority Data

Aug. 23, 2021 (CN) ......................... 202110972502.0

(51) Int. Cl.
*H04R 1/10* (2026.01)
*G10L 21/0208* (2013.01)

(52) U.S. Cl.
CPC ........ *H04R 1/1083* (2013.01); *G10L 21/0208* (2013.01); *G10L 2021/02082* (2013.01); *H04R 2460/01* (2013.01)

(58) Field of Classification Search
CPC .... H04R 1/1083; H04R 2460/01; H04R 1/10; H04R 3/02; G10L 21/0208;
(Continued)

(56) References Cited

U.S. PATENT DOCUMENTS 9,554,210 B1 * 1/2017 Ayrapetian ............... H04R 3/02
10,652,654 B1 * 5/2020 Forrester .................. H04R 3/04
(Continued)

FOREIGN PATENT DOCUMENTS

CN 104871556 A 8/2015
CN 110972018 A 4/2020
(Continued)

OTHER PUBLICATIONS

Notification to Grant issued in Chinese Patent Application No. 202110972502.0; mailed Sep. 5, 2022, 5 pgs.
(Continued)

*Primary Examiner* — Carolyn R Edwards
*Assistant Examiner* — Julie X Dang
(74) *Attorney, Agent, or Firm* — HAUPTMAN HAM, LLP

(57) ABSTRACT

Disclosed are an earphone and an earphone control method. The earphone includes a shell, a speaker, a feedback microphone, a transparency filter and a fixed filter. The shell is provided with a sound chamber. The speaker is provided in the sound chamber. The feedback microphone is provided in the sound chamber. The transparency filter is provided in the shell, an input end of the transparency filter is connected to an output end of the feedback microphone, and an output end of the transparency filter is connected to an input end of the speaker. The fixed filter is provided in the shell, an input end of the fixed filter is connected to the input end of the speaker, and an output end of the fixed filter is connected to the input of the transparency filter.

10 Claims, 6 Drawing Sheets

(58) Field of Classification Search
CPC ....... G10L 2021/02082; G10L 21/0216; G10L 2021/02165; H04M 9/082
See application file for complete search history.

(56) References Cited

U.S. PATENT DOCUMENTS

| | | | | |
|---|---|---|---|---|
| 2010/0017205 | A1* | 1/2010 | Visser | G10L 19/00 704/E21.002 |
| 2013/0028462 | A1* | 1/2013 | Chen | H04R 1/1083 381/375 |
| 2014/0126733 | A1* | 5/2014 | Gauger, Jr. | G10K 11/1783 381/71.6 |
| 2017/0245045 | A1* | 8/2017 | Horbach | G10K 11/17817 |
| 2017/0289727 | A1* | 10/2017 | Taira | H04S 7/301 |

FOREIGN PATENT DOCUMENTS

| | | | |
|---|---|---|---|
| CN | 111010646 | A | 4/2020 |
| CN | 111405406 | A | 7/2020 |
| CN | 111935584 | A | 11/2020 |
| CN | 112770214 | A | 5/2021 |
| CN | 113542966 | A | 10/2021 |
| WO | 2006037156 | A1 | 4/2006 |

OTHER PUBLICATIONS

International Search Report and Written Opinion issued in International Application No. PCT/CN2021/138955; mailed Mar. 29, 2022; 14 pgs.

* cited by examiner

EARPHONE AND EARPHONE CONTROL METHOD

CROSS-REFERENCE TO RELATED APPLICATIONS

This application is a continuation application of International Application No. PCT/CN2021/138955, filed on Dec. 17, 2021, which claims priority to Chinese Patent Application No. 202110972502.0, filed on Aug. 23, 2021. The disclosures of the above-mentioned applications are incorporated herein by reference in their entireties.

TECHNICAL FIELD

The present application relates to the technical field of earphones, and in particular, to an earphone and an earphone control method.

BACKGROUND

Transparency mode is a common function of earphones. Its purpose is to enable the wearer to hear the ambient sounds outside the earphones clearly without taking off the earphones. A common solution to achieve transparency mode is to collect external sounds through a feedforward microphone provided outside the earphone shell, process the collection signal accordingly, and then play the collection signal out through the speakers. In this way, the user can hear the outside environment sound.

However, when using the transparency mode in a windy scene, the feedforward microphone provided outside the earphone shell will pick up a large amount of wind noise, causing the speaker to broadcast a large amount of redundant wind noise while broadcasting the external environment sound, which results in a very poor user experience.

SUMMARY

The main purpose of the present application is to provides an earphone, which aims to solve the existing problem of wind noise when the earphone transparency mode is used in windy scenes, such that the earphones can maintain a better transparency mode effect in windy scenes.

In order to achieve the above purpose, the present application provides an earphone. The earphone includes a shell, a speaker, a feedback microphone, a transparency filter and a fixed filter. The shell is provided with a sound chamber. The speaker is provided in the sound chamber. The feedback microphone is provided in the sound chamber. The transparency filter is provided in the shell, an input end of the transparency filter is connected to an output end of the feedback microphone, and an output end of the transparency filter is connected to an input end of the speaker. The fixed filter is provided in the shell, an input end of the fixed filter is connected to the input end of the speaker, and an output end of the fixed filter is connected to the input of the transparency filter.

In some embodiments, the earphone further includes an adaptive filter provided in the shell. The input end of the adaptive filter is connected to the output end of the fixed filter, and an output end of the adaptive filter is connected to the input end of the transparency filter.

In order to achieve the above purpose, the present application further provides an earphone control method applied to the above-mentioned earphone. The earphone control method includes:

obtaining a collection signal picked up by the feedback microphone, and a first source signal of the speaker during a sound pickup phase of the feedback microphone;

generating an echo cancellation signal through the fixed filter according to the first source signal;

determining a transparency audio signal based on the collection signal and the echo cancellation signal; and determining a second source signal based on the transparency audio signal and a music signal to be played, and controlling the speaker to play audio based on the second source signal.

In some embodiments, the echo cancellation signal is an inverse signal of the first source signal; or the echo cancellation signal is a signal formed by attenuating and inverting the first source signal.

In some embodiments, the determining the transparency audio signal based on the collection signal and the echo cancellation signal includes:

superimposing the collection signal and the echo cancellation signal to obtain a first superposition signal; and amplifying the first superposition signal through the transparency filter to obtain the transparency audio signal.

In some embodiments, the earphone further includes an adaptive filter, and the determining the transparency audio signal based on the collection signal and the echo cancellation signal includes:

compensating the echo cancellation signal through the adaptive filter to obtain a correction signal;

superimposing the collection signal and the correction signal to obtain a second superposition signal; and amplifying the second superposition signal through the transparency filter to obtain the transparency audio signal.

In some embodiments, the compensating the echo cancellation signal through the adaptive filter to obtain the correction signal includes:

calculating a correlation between the first source signal and the collection signal;

in response to that the correlation is greater than a preset threshold, adjusting a transfer function of the adaptive filter; and compensating the echo cancellation signal according to an adjusted transfer function to obtain the correction signal.

In some embodiments, after the calculating the correlation between the first source signal and the collection signal, the method further includes:

in response to that the correlation is less than or equal to the preset threshold, compensating the echo cancellation signal according to the transfer function of the adaptive filter to obtain the correction signal.

In some embodiments, the obtaining the collection signal picked up by the feedback microphone and the first source signal of the speaker during the sound pickup phase of the feedback microphone, the method further includes:

infeeding a first frequency sweep signal to the speaker and obtaining a first feedback signal collected by the feedback microphone; and determining a transfer function of the fixed filter according to the first frequency sweep signal and the first feedback signal.

In some embodiments, before the obtaining the collection signal picked up by the feedback microphone and the first source signal of the speaker during the sound pickup phase of the feedback microphone, the method further includes:

infeeding a second sweep signal to the speaker and obtaining a second feedback signal collected by the feedback microphone;

calculating a test transfer function according to the second frequency sweep signal and the second feedback signal; and determining a transfer function of the adaptive filter based on a difference between the test transfer function and a transfer function of the fixed filter.

In order to achieve the above purpose, the present application further provides an earphone system. The earphone system includes a memory, a processor, and a computer program stored on the memory and executable on the processor. When the computer program is executed by the processor, the steps of the earphone control method as described above are implemented.

In order to achieve the above purpose, the present application further provides a storage medium. The storage medium stores an earphone control program. When the earphone control program is executed by the processor, the steps of the earphone control method as described above are implemented.

In the technical solution of the present application, the feedback microphone located in the sound chamber of the earphone picks up the sound (including the external environmental sound passing through the shell and the sound emitted by the speaker) and converts the sound into a collection signal and transmits collection signal to the input end of the transparency filter, and after the first source signal transported to the speaker is inverted by the fixed filter, the first source signal is led to the input end of the transparency filter, such that the echo signal in the collection signal picked up by the feedback microphone is offset. In this way, only the electrical signal converted from the currently external ambient sound outside the shell may enter into the transparency filter is amplified by the transparency filter and then is input into the speaker together with the music signal to be played. The speaker plays the music and external ambient sound. In this way, the ambient sounds of the outside world are clearly heard while the user is listening to the music. Since the feedback microphone is placed in the sound chamber of the earphone and is not affected by wind noise, it can effectively solve the problem of wind noise in windy scene while maintaining a better transparency mode effect. The fixed filter may perform the corresponding echo processing, which may overcome music quality changes and howling problems.

BRIEF DESCRIPTION OF THE DRAWINGS

In order to more clearly illustrate the technical solutions in some embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
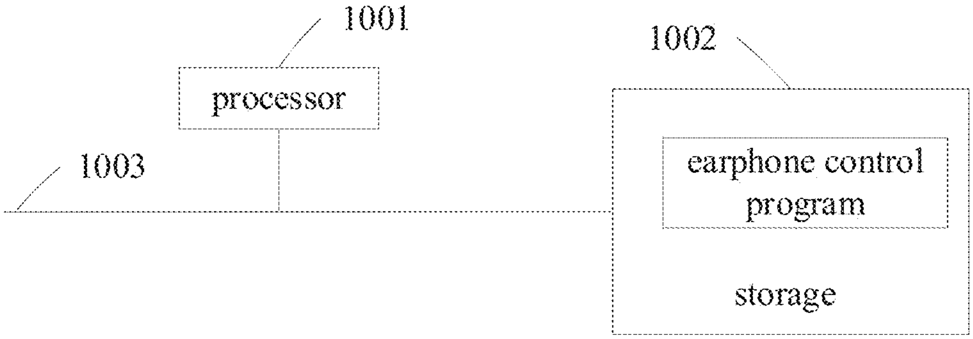
FIG. 1 is a schematic structural view of a hardware structure of an earphone according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in some embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indications (such as up, down, left, right, front, rear, etc.) In some embodiments of the present application are only used to explain the relative positional relationship, movement situation, etc. among components in a specific attitude (as shown in the drawings). If the specific attitude changes, the directional indication also changes accordingly.

In addition, the descriptions related to “first”, “second” and the like in the present application are merely for descriptive purposes, and should not be understood as indicating or implying their relative importance or implicitly indicating the number of technical features indicated. Therefore, the features defined by “first” and “second” may explicitly or implicitly include at least one such feature. In addition, “and/or” in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

As shown in FIG. 1, FIG. 1 is a schematic structural view of a hardware structure of an earphone according to some embodiments of the present application.

The present application provides an earphone. The earphone includes: a processor 1001, such as a central processing unit (CPU), a memory 1002, and a communication bus 1003. The communication bus 1003 is used to realize connection communication between these components.

The memory 1002 may be a high-speed random access memory (RAM) or a stable memory (non-volatile memory), such as a disk memory. As shown in FIG. 1, the memory 1002, which is a computer storage medium, may include an earphone control program, and the processor 1001 may be used to call the earphone control program stored in the memory 1002 and perform the following operations:

- obtaining a collection signal picked up by a feedback microphone 20, and a first source signal of a speaker 10 during a sound pickup phase of the feedback microphone 20;
- generating an echo cancellation signal through a fixed filter according to the first source signal;
- determining a transparency audio signal based on the collection signal and the echo cancellation signal; and
- determining a second source signal based on the transparency audio signal and a music signal to be played, and controlling the speaker 10 to play audio based on the second source signal.

Further, the processor 1001 can be used to call the earphone control program stored in the memory 1002, and perform the following operations:

- superimposing the collection signal and the echo cancellation signal to obtain a first superposition signal; and
- amplifying the first superposition signal through the transparency filter 30 to obtain the transparency audio signal.

Further, the processor 1001 can be used to call the earphone control program stored in the memory 1002, and perform the following operations:

- compensating the echo cancellation signal through the adaptive filter 50 to obtain a correction signal;
- superimposing the collection signal and the correction signal to obtain a second superposition signal; and
- amplifying the second superposition signal through the transparency filter 30 to obtain the transparency audio signal.

Further, the processor 1001 can be used to call the earphone control program stored in the memory 1002, and perform the following operations:

- calculating a correlation between the first source signal and the collection signal;
- in response to that the correlation is greater than a preset threshold, adjusting a transfer function of the adaptive filter 50; and
- compensating the echo cancellation signal according to an adjusted transfer function to obtain the correction signal.

Further, the processor 1001 can be used to call the earphone control program stored in the memory 1002, and perform the following operations:

- in response to that the correlation is less than or equal to the preset threshold, compensating the echo cancellation signal according to a transfer function of the adaptive filter 50 to obtain the correction signal.

Further, the processor 1001 can be used to call the earphone control program stored in the memory 1002, and perform the following operations:

- infeeding a first frequency sweep signal to the speaker 10 and obtaining a first feedback signal collected by the feedback microphone 20; and
- determining a transfer function of the fixed filter 40 according to the first frequency sweep signal and the first feedback signal.

Further, the processor 1001 can be used to call the earphone control program stored in the memory 1002, and perform the following operations:

- infeeding a second sweep signal to the speaker 10 and obtaining a second feedback signal collected by the feedback microphone 20;
- calculating a test transfer function according to the second frequency sweep signal and the second feedback signal; and
- determining a transfer function of the adaptive filter 50 based on a difference between the test transfer function and a transfer function of the fixed filter 40.

Figure 2:
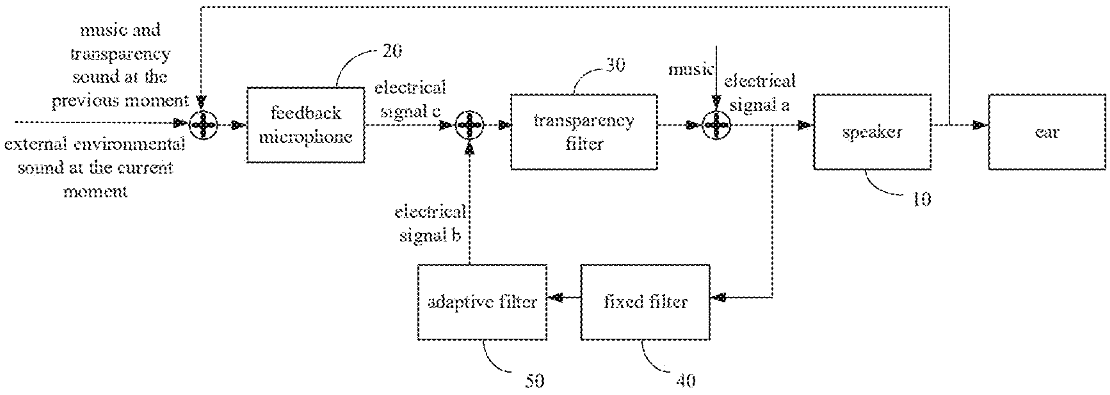
FIG. 2 is a schematic view of a signal flowing direction of the earphone according to some embodiments of the present application.

In some embodiments of the present application, as shown in FIG. 2, the earphone includes a shell, a speaker 10, a feedback microphone 20, a transparency filter 30 and a fixed filter 40. The shell is provided with a sound chamber. The speaker 10 is provided in the sound chamber. The feedback microphone 20 is provided in the sound chamber. The transparency filter 30 is provided in the shell, an input end of the transparency filter 30 is connected to an output end of the feedback microphone 20, and an output end of the transparency filter 30 is connected to an input end of the speaker 10. the fixed filter 40 is provided in the shell, an input end of the fixed filter 40 is connected to the input end of the speaker 10, and an output end of the fixed filter 40 is connected to the input of the transparency filter 30.

Specifically, the shell of the earphone is provided with a sound chamber, and the speaker 10 and the feedback microphone 20 are provided in the sound chamber. The transparency filter 30 and the fixed filter 40 can be integrated on the main control circuit board and electrically connected with the processor on the main control circuit board. The main control circuit board is provided inside the shell. The main control circuit board is electrically connected to the speaker 10 and the feedback microphone 20 through wires. The earphone of the present application can be wired or wireless. When the earphone is a wired earphone, the processor obtains the music signal from the audio source device through the earphone cable. When the earphone is a wireless earphone, the processor obtains the music signal from the audio source device through the Bluetooth® module.

The earphone of the present application has a transparency mode. The working principle is: the feedback microphone 20 located in the sound chamber of the earphone picks up the external environmental sound after being attenuated by the shell and converts the sound into an electrical signal. After being amplified by the transparency filter 30, the electrical signal is input into the speaker 10 together with the music signal received from the sound source device, and the speaker 10 plays the music and external environmental sounds. In this way, the user can clearly hear the external environmental sounds while listening to the music.

Since the feedback microphone 20 and the speaker 10 are co-located in the sound chamber, the feedback microphone 20 not only picks up the external ambient sound after being attenuated by the shell, but also picks up the sound played by the speaker 10 at the same time. The sound played by the speaker 10 includes two parts: one is music, and the other is the sound of the ambient sound picked up by the feedback microphone 20 at the previous moment amplified by the transparency filter 30. These two parts should not be picked up and processed by the feedback microphone 20, otherwise the music quality will change and the transparency mode will become less robust, leading to howling.

Therefore, in the present application, a fixed filter 40 is provided between the input end of the speaker 10 and the input end of the transparency filter 30. the fixed filter 40 inverts the first source signal input to the speaker 10 and then leads the first source signal to the input end of the transparency filter 30. In the collection signal picked up by the feedback microphone 20, the above two echo signals are offset, so that only the electrical signal converted from the currently external environmental sound that penetrates and enters the shell may enter the transparency filter 30, thereby overcoming the changes in music quality and howling problem.

Specifically, please referring to FIG. 1, taking the current moment as an example, the collection signal (electrical signal c) picked up by the feedback microphone 20 includes three parts: the electrical signal transformed by the external environmental sound at the current moment; the electrical signal transformed by the sound played by the speaker 10 including the electrical signal converted from the music at the previous moment; and the electrical signal converted from the ambient sound picked up by the feedback microphone 20 at the previous moment and amplified by the transparency filter 30.

The input end of the fixed filter 40 receives the first source signal (electrical signal a) from the input end of the speaker 10 at the previous moment. The first source signal (electrical signal a) includes the music signal at the previous moment and the transparency audio signal at the previous moment. The output end of the fixed filter 40 outputs an echo cancellation signal (electrical signal b), and the echo cancellation signal (electrical signal b) can be an inverse signal of the first source signal (electrical signal a), that is to say, the electrical signal b and the electrical signal a are equal and inverted. The relationship between the first source signal (electrical signal a) and the collection signal (electrical signal c) is: the first source signal (electrical signal a) is broadcast by the speaker 10 to form music at the previous moment and transparency sound at the previous moment. The music at the previous moment and the transparency sound at the previous moment together with the ambient sound at the current moment are picked up by the feedback microphone 20 to obtain the collection signal (electrical signal c). At the same time, the first source signal (electrical signal a) is input to the fixed filter 40, and an inversion operation is performed to obtain an echo cancellation signal (electrical signal b). Then, the collection signal (electrical signal c) and the echo cancellation signal (electrical signal b) are superimposed and input into the transparency filter 30. Since the echo cancellation signal (electrical signal b) is equal to inverted with the first source signal (electrical signal a), after superpositioning the collection signal (electrical signal c) and the echo cancellation signal (electrical signal b), only the electrical signal converted from the ambient sound at the current moment enters the transparency filter 30, and is amplified by the transparency filter 30 to form a transparency audio signal at the current moment and input to the speaker 10. In addition, the music signal at the current moment is input to the speaker 10, such that the ambient sound at the current moment and the music at the current moment can be played through the speaker 10 to achieve the transparency mode effect.

Further, the echo cancellation signal may be an inverse signal of the first source signal; or the echo cancellation signal may be a signal formed by attenuating and inverting the first source signal. Considering the fact that the signal is attenuated after the signal input is played by the speaker 10 and then picked up by the feedback microphone 20. The degree of attenuation can be determined through testing, and the transfer function of the fixed filter 40 is determined with reference to this factor, such that the echo cancellation signal output by the fixed filter 40 can accurately offset the echo signal in the collection signal of the feedback microphone 20.

Therefore, in the technical solution of the present application, the sound is picked up by the feedback microphone 20, and after corresponding echo processing is performed, the external environmental sound is amplified by the transparency filter 30 and consequently captured by the human ear. Since the feedback microphone 20 is provided in the sound chamber of the earphone and is not affected by wind noise, it can effectively solve the problem of wind noise in windy scenes while maintaining a better transparency mode effect.

Further, please referring to FIG. 2, the earphone further includes an adaptive filter 50 provided in the shell. An input end of the adaptive filter 50 is connected to the output end of the fixed filter 40, and an output end of the adaptive filter 50 is connected to the input end of the transparency filter 30.

For each specific earphone product, due to the mass production process, the response of the speaker 10, microphone or cavity of each earphone will be inconsistent. When the fixed filter 40 with the same transfer function is applied to different earphone products, there are differences in configurations and it is difficult to meet the requirements of all products. Therefore, in these embodiments, an adaptive filter 50 is provided between the output end of the fixed filter 40 and the input end of the transparency filter 30, such that the transfer function from the speaker 10 to the feedback microphone 20 of each product can be tested during the production line test process. The difference between the inverted test transfer function and the determined transfer function of the fixed filter 40 is calculated, and the adaptive filter 50 is used to fit the difference. In this way, each product can ensure that the echo signal in the collection signal is completely canceled out when it is working.

Figure 3:
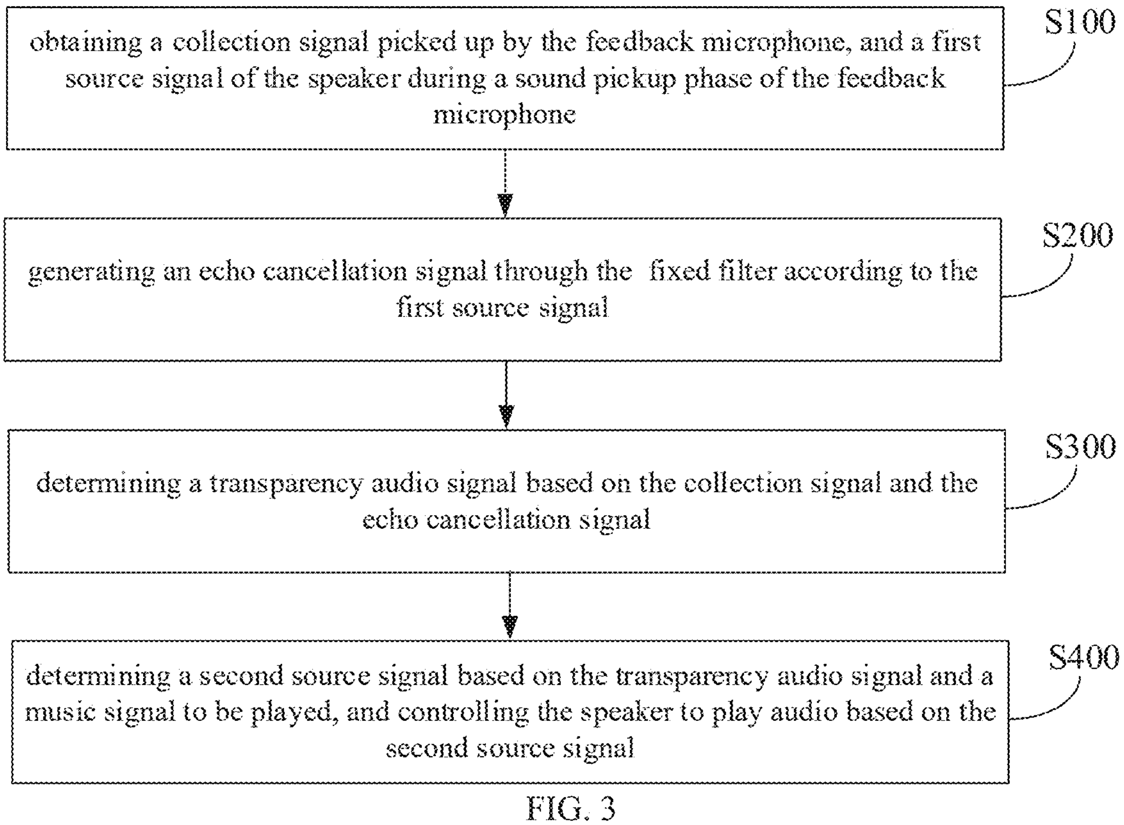
FIG. 3 is a schematic flowchart of an earphone control method according to some embodiments of the present application.

Based on the above hardware structure as shown in FIG. 3. The present application proposes some embodiments of an earphone control method. In these embodiments, the earphone control method includes the following steps:

- S100, obtaining a collection signal picked up by a feedback microphone 20, and a first source signal of a speaker 10 during a sound pickup phase of the feedback microphone 20;
- S200, generating an echo cancellation signal through a fixed filter according to the first source signal;
- S300, determining a transparency audio signal based on the collection signal and the echo cancellation signal; and
- S400, determining a second source signal based on the transparency audio signal and a music signal to be played, and controlling the speaker 10 to play audio based on the second source signal.

In the technical solution of the present application, specifically, the shell of the earphone is provided with a sound chamber, and the speaker 10 and the feedback microphone 20 are provided in the sound chamber. The transparency filter 30 and the fixed filter 40 can be integrated on the main control circuit board and electrically connected with the processor on the main control circuit board. The main control circuit board is provided inside the shell. The main control circuit board is electrically connected to the speaker 10 and the feedback microphone 20 through wires. The earphone of the present application can be wired or wireless. When the earphone is a wired earphone, the processor obtains the music signal from the audio source device through the earphone cable. When the earphone is a wireless earphone, the processor obtains the music signal from the audio source device through the Bluetooth® module.

The earphone of the present application has a transparency mode. The working principle is: the feedback microphone 20 located in the sound chamber of the earphone picks up the external environmental sound after being attenuated by the shell and converts the sound into an electrical signal. After being amplified by the transparency filter 30, the electrical signal is input into the speaker 10 together with the music signal received from the sound source device, and the speaker 10 plays the music and external environmental sounds. In this way, the user can clearly hear the external environmental sounds while listening to the music.

Since the feedback microphone 20 and the speaker 10 are co-located in the sound chamber, the feedback microphone 20 not only picks up the external ambient sound after being attenuated by the shell, but also picks up the sound played by the speaker 10 at the same time. The sound played by the speaker 10 includes two parts: one is music, and the other is the sound of the ambient sound picked up by the feedback microphone 20 at the previous moment amplified by the transparency filter 30. These two parts should not be picked up and processed by the feedback microphone 20, otherwise the music quality will change and the transparency mode will become less robust, leading to howling.

Therefore, in the present application, a fixed filter 40 is provided between the input end of the speaker 10 and the input end of the transparency filter 30. the fixed filter 40 inverts the first source signal input to the speaker 10 and then leads the first source signal to the input end of the transparency filter 30. In the collection signal picked up by the feedback microphone 20, the above two echo signals are offset, so that only the electrical signal converted from the currently external environmental sound that penetrates and enters the shell may enter the transparency filter 30, thereby overcoming the changes in music quality and howling problem.

Specifically, please referring to FIG. 1, taking the current moment as an example, the collection signal (electrical signal c) picked up by the feedback microphone 20 includes three parts: the electrical signal transformed by the external environmental sound at the current moment; the electrical signal transformed by the sound played by the speaker 10 including the electrical signal converted from the music at the previous moment; and the electrical signal converted from the ambient sound picked up by the feedback microphone 20 at the previous moment and amplified by the transparency filter 30.

The input end of the fixed filter 40 receives the first source signal (electrical signal a) from the input end of the speaker 10 at the previous moment. The first source signal (electrical signal a) includes the music signal at the previous moment and the transparency audio signal at the previous moment. The output end of the fixed filter 40 outputs an echo cancellation signal (electrical signal b), and the echo cancellation signal (electrical signal b) can be an inverse signal of the first source signal (electrical signal a), that is to say, the electrical signal b and the electrical signal a are equal and inverted. The relationship between the first source signal (electrical signal a) and the collection signal (electrical signal c) is: the first source signal (electrical signal a) is broadcast by the speaker 10 to form music at the previous moment and transparency sound at the previous moment. The music at the previous moment and the transparency sound at the previous moment together with the ambient sound at the current moment are picked up by the feedback microphone 20 to obtain the collection signal (electrical signal c). At the same time, the first source signal (electrical signal a) is input to the fixed filter 40, and an inversion operation is performed to obtain an echo cancellation signal (electrical signal b). Then, the collection signal (electrical signal c) and the echo cancellation signal (electrical signal b) are superimposed and input into the transparency filter 30. Since the echo cancellation signal (electrical signal b) is equal to inverted with the first source signal (electrical signal a), after superpositioning the collection signal (electrical signal c) and the echo cancellation signal (electrical signal b), only the electrical signal converted from the ambient sound at the current moment enters the transparency filter 30, and is amplified by the transparency filter 30 to form a transparency audio signal at the current moment and input to the speaker 10. In addition, the music signal at the current moment is input to the speaker 10, such that the ambient sound at the current moment and the music at the current moment can be played through the speaker 10 to achieve the transparency mode effect.

Further, the echo cancellation signal may be an inverse signal of the first source signal; or the echo cancellation signal may be a signal formed by attenuating and inverting the first source signal. Considering the fact that the signal is attenuated after the signal input is played by the speaker 10 and then picked up by the feedback microphone 20. The degree of attenuation can be determined through testing, and the transfer function of the fixed filter 40 is determined with reference to this factor, such that the echo cancellation signal output by the fixed filter 40 can accurately offset the echo signal in the collection signal of the feedback microphone 20.

Therefore, in the technical solution of the present application, the sound is picked up by the feedback microphone 20, and after corresponding echo processing is performed, the external environmental sound is amplified by the transparency filter 30 and consequently captured by the human ear. Since the feedback microphone 20 is provided in the sound chamber of the earphone and is not affected by wind noise, it can effectively solve the problem of wind noise in windy scenes while maintaining a better transparency mode effect.

Figure 4:
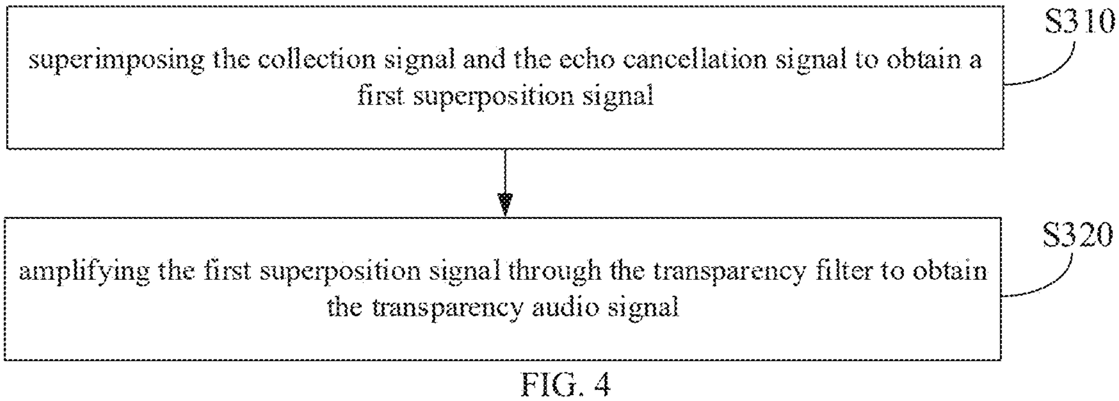
FIG. 4 is a schematic flowchart of sub-steps of step S300 of the earphone control method according to some embodiments of the present application.

Further, please referring to FIG. 4, the present application proposes some other embodiments of an earphone control method. Based on the above-mentioned embodiments, the step S300 includes:

S310, superimposing the collection signal and the echo cancellation signal to obtain a first superposition signal; and S320, amplifying the first superposition signal through the transparency filter 30 to obtain the transparency audio signal.

In some embodiments of the present application, before the echo cancellation signal formed by the fixed filter 40 processing the first source signal input to the speaker 10 at the previous moment is input to the transparency filter 30, the echo cancellation signal is superimposed with the collection signal input to the transparency filter 30 and picked up by the microphone. After the two are superimposed, the echo signal contained in the collection signal can be offset, such that only the electrical signal converted from the external ambient sound at the current moment is input to the transparency filter 30 and amplified by the transparency filter 30 to form a transparency audio. The transparency audio is input into the speaker 10, and then the music signal at the current moment is input into the speaker 10 together. In this way, the ambient sound at the current moment and the music at the current moment can be played through the speaker 10 to achieve the transparency mode effect.

Figure 5:
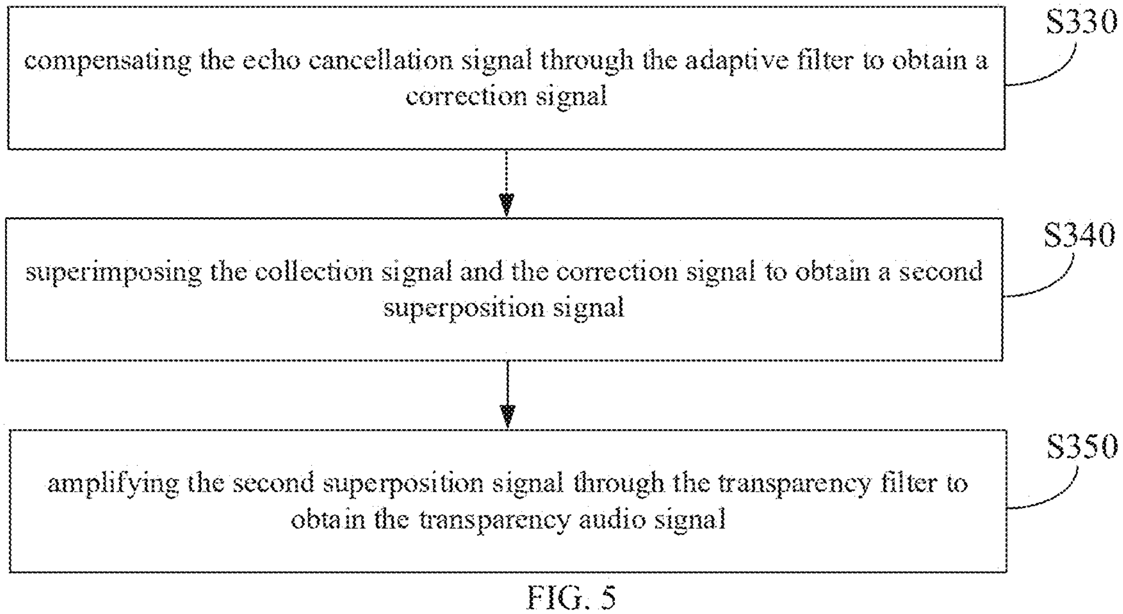
FIG. 5 is a schematic flowchart of sub-steps of step S300 of the earphone control method according to some other embodiments of the present application.

Further, please referring to FIG. 5. the present application proposes a yet some other embodiments of an earphone control method. Based on the above-mentioned embodiments, the step S300 includes:

S330, compensating the echo cancellation signal through the adaptive filter 50 to obtain a correction signal;

S340, superimposing the collection signal and the correction signal to obtain a second superposition signal; and S350, amplifying the second superposition signal through the transparency filter 30 to obtain the transparency audio signal.

For each specific earphone product, due to the mass production process, the response of the speaker 10, microphone or cavity of each earphone will be inconsistent. When the fixed filter 40 with the same transfer function is applied to different earphone products, there are differences in configurations and it is difficult to meet the requirements of all products. Therefore, in these embodiments, an adaptive filter 50 is provided between the output end of the fixed filter 40 and the input end of the transparency filter 30, such that the transfer function from the speaker 10 to the feedback microphone 20 of each product can be tested during the production line test process. The difference between the inverted test transfer function and the determined transfer function of the fixed filter 40 is calculated, and the adaptive filter 50 is used to fit the difference.

Specifically, when the product is working, the fixed filter 40 inputs the echo cancellation signal formed by the fixed filter 40 processing of the first source signal input to the speaker 10 at the previous moment into the adaptive filter 50, and the echo cancellation signal is compensated by the adaptive filter 50. Finally, the corrected correction signal can be obtained. When the correction signal is superimposed with the collection signal picked up by the feedback microphone 20, it can ensure that the echo signal in the collection signal is completely offset, such that only the electrical signal input converted from the external environmental sound at the current moment can be put into the transparency filter 30. In this way, a better transparency mode effect can be achieved and better music quality can be ensured.

Figure 6:
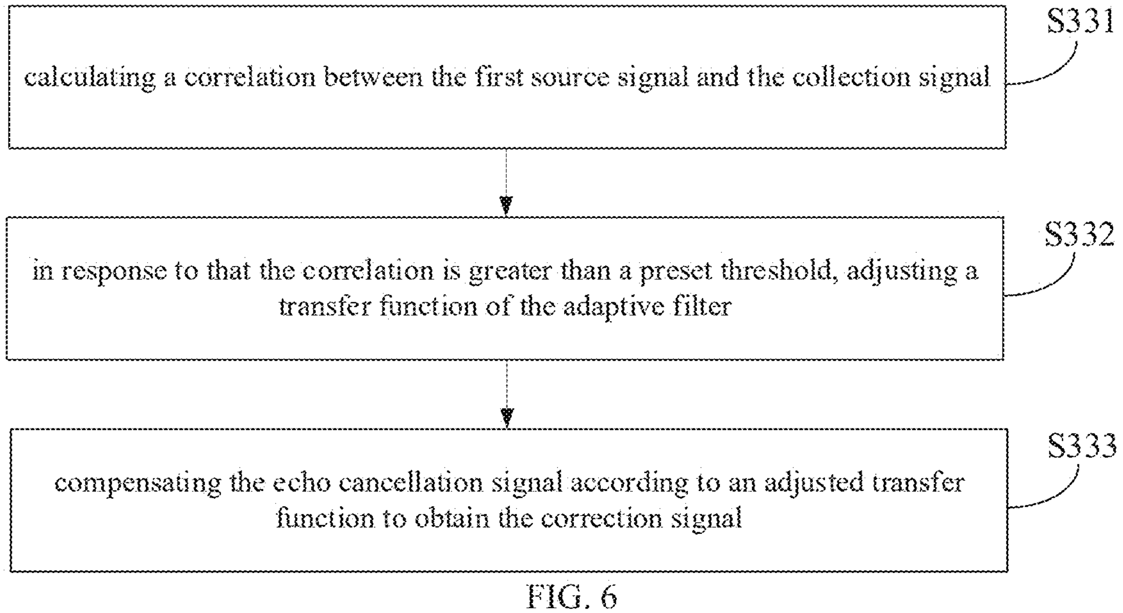
FIG. 6 is a schematic flowchart of sub-steps of step S300 of the earphone control method according to yet some other embodiments of the present application.

Further, please referring to FIG. 6, the present application proposes still some other embodiments of an earphone control method. Based on the above-mentioned embodiment, the step S330 includes:

S331, calculating a correlation between the first source signal and the collection signal;

S332, in response to that the correlation is greater than a preset threshold, adjusting a transfer function of the adaptive filter 50; and S333, compensating the echo cancellation signal according to an adjusted transfer function to obtain the correction signal.

When different users use the same earphone product, due to differences in each user's physiological structure, the fit between the earphone and the user's ears is inconsistent. When using the earphone, the transfer function of the adaptive filter 50 adjusted through the production line testing process still cannot meet the usage conditions of different users. Therefore, the transfer function of the adaptive filter 50 can be dynamically adjusted through a correlation calculation every time the earphone is used.

Specifically, the correlation calculation is first performed on the first source signal input to the speaker 10 and the collection signal output by the feedback microphone 20. The so-called correlation calculation refers to studying the relationship between two or more signals in the signal analysis. For example, in a communication system, a radar system, or a control system, the signal waveform emitted by the transmitting end (such as the speaker 10 in these embodiments) is known, and their similarity or dependence is utilized to determine among the signal (or callback) at the receiving end (such as the feedback microphone 20 in these embodiment), whether there is a signal sent by the sending end. Specifically, the correlation result is between 0 and 1. The smaller the correlation (closer to 0), the less the transmitting signal exists in the receiving signal. On the contrary, the larger the correlation (closer to 1), the more transmitter signal exists in the receiving signal.

In these embodiments, it is necessary to completely eliminate the part of the collection signal that is related to the first source signal. According to the size of the correlation calculation result, the transfer function of the adaptive filter 50 can be adjusted accordingly, such that the transfer function of the adaptive filter 50 can accurately compensate the transfer function of the fixed filter 40 to ensure that the echo signal in the collection signal is completely canceled out after the correction signal output by the adaptive filter 50 is superimposed on the collection signal picked up by the feedback microphone 20. In this way, a better transparency mode effect can be achieved and better music quality can be ensured.

Figure 7:
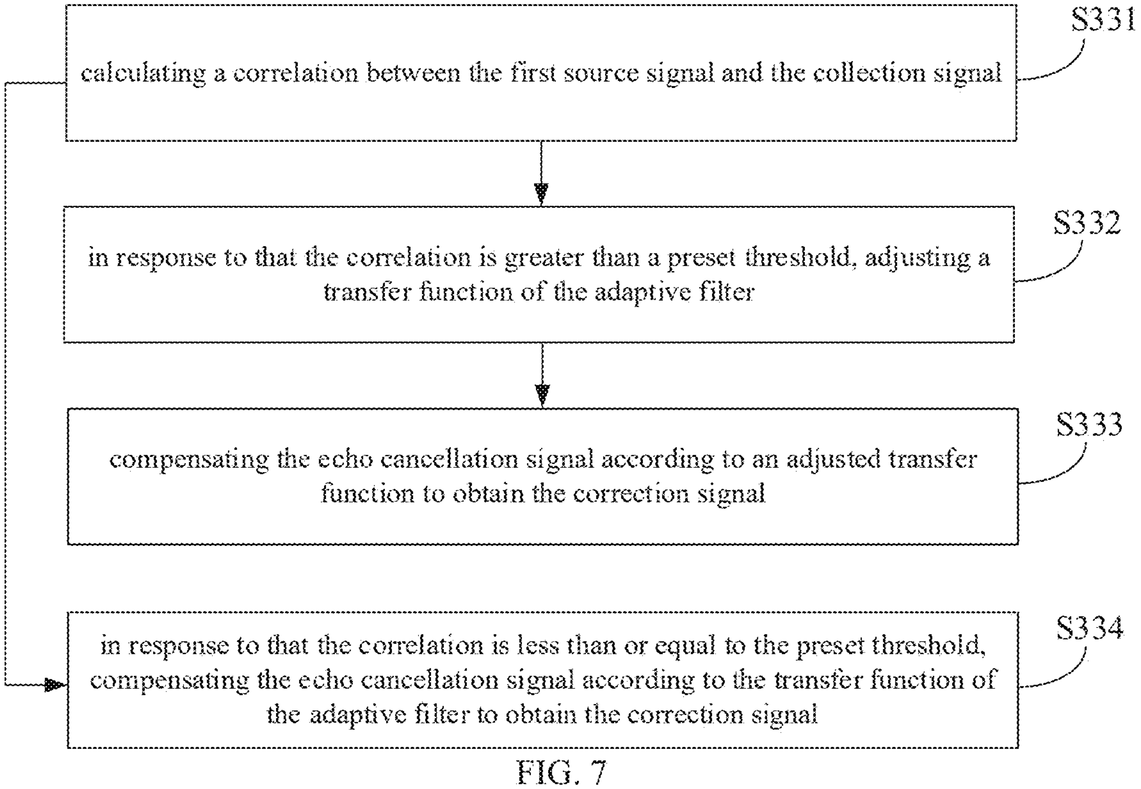
FIG. 7 is a schematic flowchart of sub-steps of step S300 of the earphone control method according to still some other embodiments of the present application.

Further, please referring to FIG. 7, the present application proposes some embodiments of an earphone control method. Based on the above-mentioned embodiments, after step S331, the method also includes:

S334, in response to that the correlation is less than or equal to the preset threshold, compensating the echo cancellation signal according to the transfer function of the adaptive filter 50 to obtain the correction signal.

In these embodiments, when adjusting the transfer function of the adaptive filter 50 according to correlation, a specific adjustment range can be set, that is, a preset threshold of correlation, such as 0.05 can be set. The correlation calculation result between the first source signal and the collection signal is compared with the preset threshold. When the calculated correlation result is greater than the preset threshold, it means that there are still more first source signals in the collection signal. At this time, the transfer function of the adaptive filter 50 needs to be adjusted. Then the correlation between the first source signal and the collection signal is calculated again, and the correlation result and the preset threshold are judged again. If the correlation result is greater than the preset threshold, it is still necessary to continue to adjust the transfer function of the adaptive filter 50, and until the cycle repeats until the correlation result is less than or equal to the preset threshold, the standard is reached. That is to say, the adaptive filter 50 will first calculate the first correlation of the original signal, then take an adjustment value, and calculate the second correlation after the signal is changed. According to the first correlation, the second correlation and the adjustment value, the next adjustment value is calculated, and the above operations are continuously iterated to get closer to the optimal solution. An indicator when adjusting the adaptive filter 50 is the step size (size of adjustment) of each adjustment. The larger the step size, the faster the iteration and the fewer iterations, but the accuracy is poor. Therefore, by reducing the size of each adjustment, the adjustment accuracy can be improved. The specific method of correlation calculation can adopt the existing technology in this field, and will not be described again here.

In these embodiments, the operation of determining the adjustment direction of the transfer function of the adaptive filter 50 through the correlation calculation method can be performed simultaneously while the earphone is working, and will not interfere with the user's normal use of the earphone, so it will not affect the user's use experience.

In addition, it should be noted that the fixed filter 40 is necessary, and the adaptive filter 50 is fine-tuned based on the fixed filter 40. Although the required transfer function can be determined through continuous adjustment through correlation calculation, if only the adaptive filter 50 is used, the adjustment range of the adaptive filter 50 is larger, the adjustment time required is also longer, and the adjustment accuracy will also be restricted.

Figure 8:
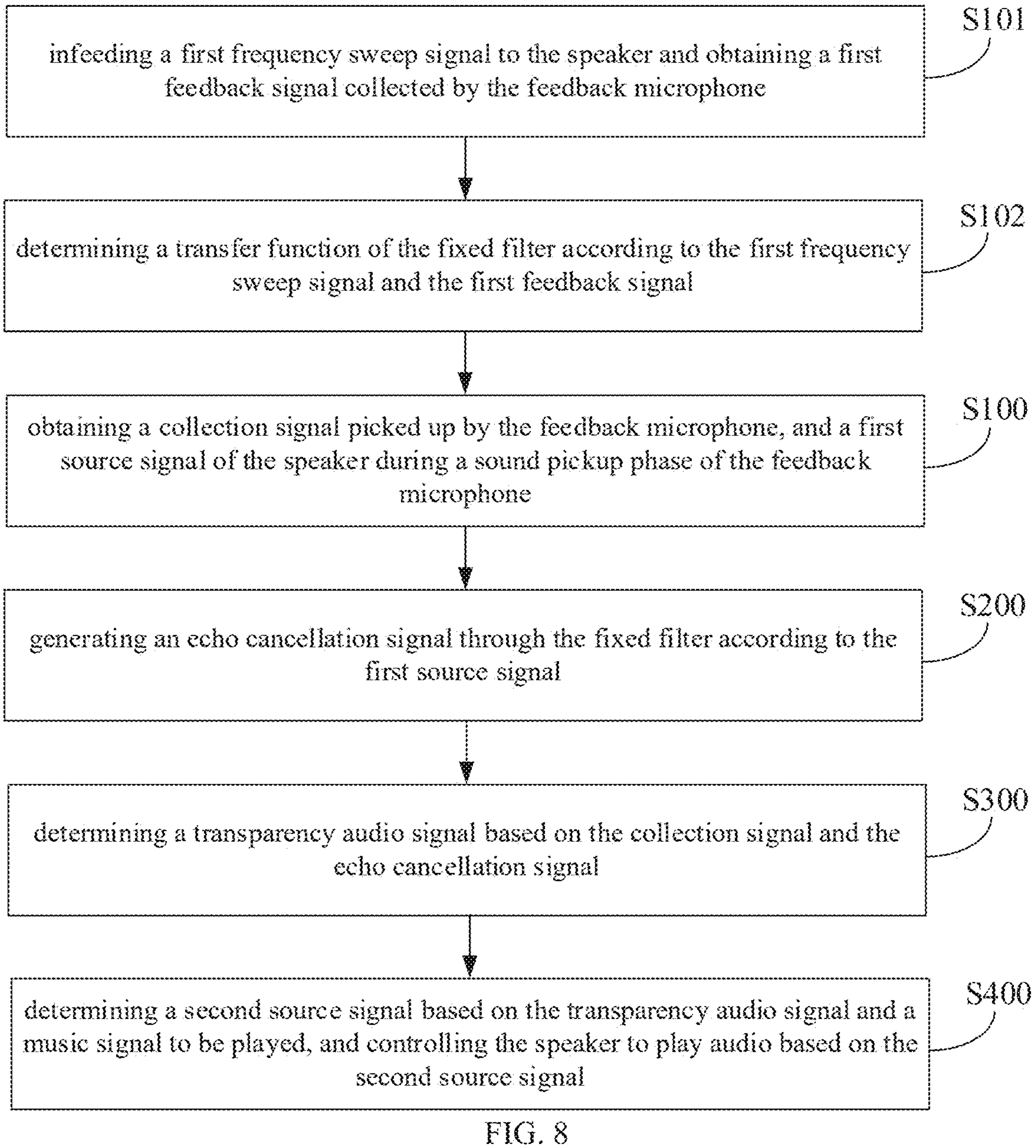
FIG. 8 is a schematic flowchart of the earphone control method according to some other embodiments of the present application.

Further, please referring to FIG. 8, the present application proposes some embodiments of an earphone control method. Based on all the above embodiments, before step S100, the method also includes:

S101, infeeding a first frequency sweep signal to the speaker 10 and obtaining a first feedback signal collected by the feedback microphone 20; and

S102, determining a transfer function of the fixed filter 40 according to the first frequency sweep signal and the first feedback signal.

In these embodiments, during the product development stage, a unified fixed filter transfer function can be determined for all earphone products of the same type. The so-called transfer function refers to the ratio of the Laplace transform (or z-transform) of the linear system response (i.e. output) quantity to the Laplace transform of the excitation (i.e. input) quantity under zero initial conditions. It is described as $G(s)=Y(s)/U(s)$, wherein $Y(s)$ and $U(s)$ are the Laplace transform of the output quantity and the Laplace transform of the input quantity respectively. The transfer function of the fixed filter 40 is obtained by inverting the transfer function from the speaker 10 to the feedback microphone 20. The test method of the transfer function from the speaker 10 to the feedback microphone 20 is: infeeding the first frequency sweep signal (the frequency sweep signal refers to a constant amplitude signal whose frequency changes periodically within a certain range. The frequency sweep signal is designed for testing and mainly used to test the frequency characteristics of components, devices, and the whole machine) to the speaker 10; testing the output of the feedback microphone 20; calculating the amplitude phase difference of the output input, thereby obtaining the transfer function from the speaker 10 to the feedback microphone 20; then inverting the transfer function (i.e. phase inversion of 180°), and finally obtaining the transfer function of the fixed filter 40.

Figure 9:
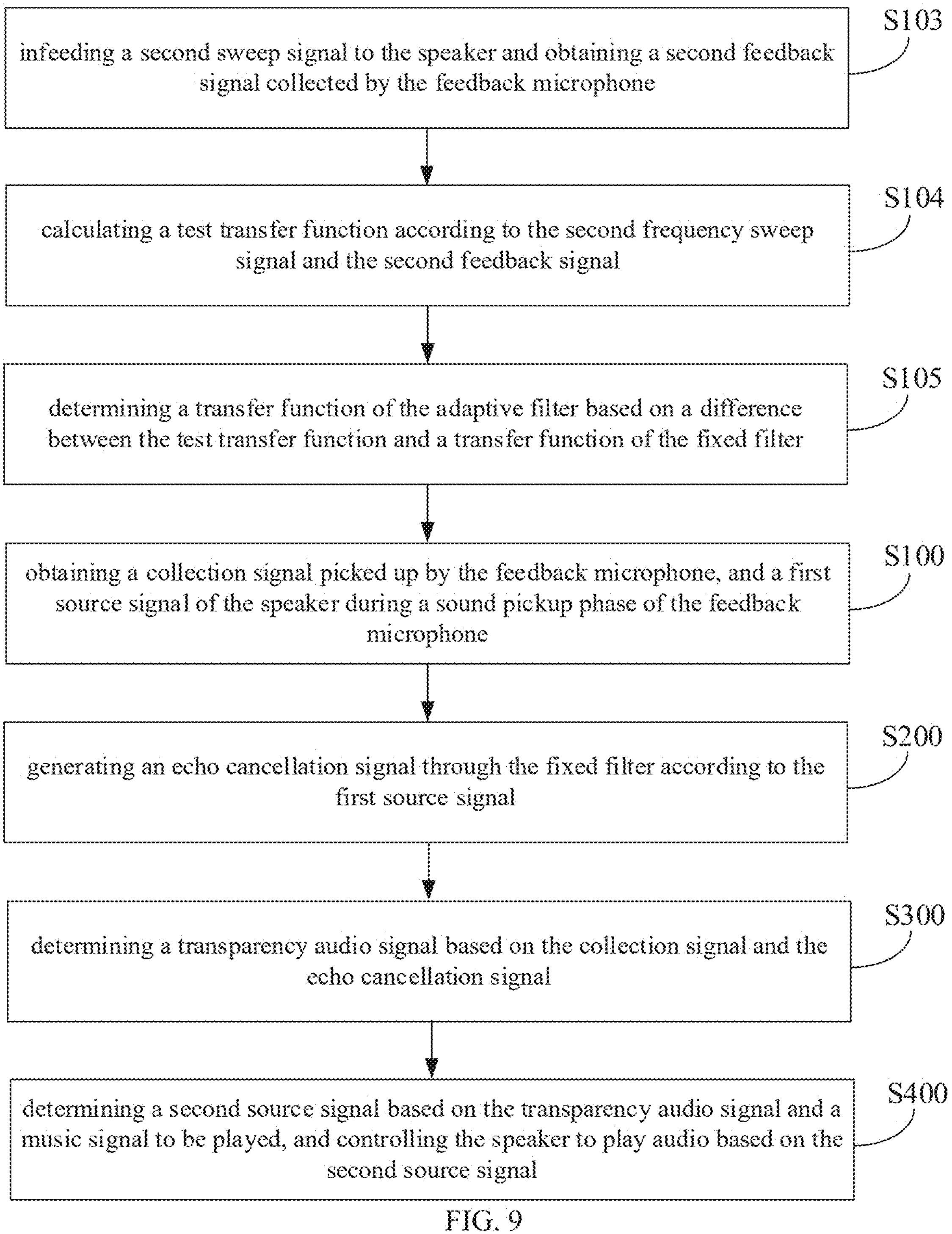
FIG. 9 is a schematic flowchart of the earphone control method according to yet some other embodiments of the present application.

Further, please referring to FIG. 9, the present application proposes some embodiments of an earphone control method. Based on all the above embodiments, before step S100, the method also includes:

S103, infeeding a second sweep signal to the speaker 10 and obtaining a second feedback signal collected by the feedback microphone 20;

S104, calculating a test transfer function according to the second frequency sweep signal and the second feedback signal; and

S105, determining a transfer function of the adaptive filter 50 based on a difference between the test transfer function and a transfer function of the fixed filter 40.

In these embodiments, during the product testing phase, each earphone product can be tested and the transfer function of the adaptive filter 50 of each product can be preset to complete the correction operation for each product. The method is still to test the transfer function from the speaker 10 to the feedback microphone 20: infeeding the second frequency sweep signal to the speaker 10; testing the output of the feedback microphone 20, calculating the amplitude phase difference between the output and input, thereby obtaining the actual transfer function from the speaker 10 to the feedback microphone 20 of each product; inverting the actual transfer function to determine the accurate transfer function that should be set under the theoretical state of the fixed filter 40; determining the transfer function of the adaptive filter 50 based on the difference between the accurate transfer function and the fixed transfer function of the fixed filter 40. In this way, compensation and correction of the fixed filter 40 achieved through the adaptive filter 50 can ensure that the echo signal in the collection signal is completely canceled out after the correction signal output by the adaptive filter 50 is superimposed on the collection signal picked up by the feedback microphone 20. In this way, a better transparency mode effect can be achieved and better music quality can be ensured.

In order to achieve the above purpose, the present application further provides an earphone system. The earphone system includes a memory, a processor, and a computer program stored on the memory and executable on the processor. When the computer program is executed by the processor, the steps of the earphone control method as described above are implemented.

In order to achieve the above purpose, the present application further provides a storage medium. The storage medium stores an earphone control program. When the earphone control program is executed by the processor, the steps of the earphone control method as described above are implemented.

The above-mentioned serial numbers of the embodiments of the present disclosure are only for description, and do not represent the advantages or disadvantages of the embodiments.

Furthermore, it should be noted that, herein, the terms "include", "including" or any other variations thereof are intended to encompass non-exclusive inclusions, so that a process, method, article or system literally including a series of elements includes not only those elements, but also other elements not expressly listed or inherent to such a process, method, article or system. Without further limitation, an element qualified by the phrase "including a . . . " does not preclude the existence of additional identical elements in the process, method, article or system that includes the element.

From the description of the above embodiments, those skilled in the art can clearly understand that the methods of the above embodiments can be implemented not only by means of a software plus a necessary general hardware platform, but also by means of a hardware. However in many cases the former is better. Based on this understanding, the technical solutions of the present disclosure in essence or the parts that make contributions to the prior art can be embodied in the form of software products. The computer software products is stored in a computer readable storage medium (such as a read-only memory/random access memory, a magnetic disk or an optical disk, etc.), and includes several instructions to make a terminal device (such as a mobile phone, a computer, a server, or a network device, etc.) execute the methods described in the various embodiments of the present disclosure.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. An earphone, comprising:

a shell provided with a sound chamber;

a speaker provided in the sound chamber;

a feedback microphone provided in the sound chamber;

a transparency filter provided in the shell, wherein an input end of the transparency filter is connected to an output end of the feedback microphone, and an output end of the transparency filter is connected to an input end of the speaker; and a fixed filter provided in the shell, wherein an input end of the fixed filter is connected to the input end of the speaker, and an output end of the fixed filter is connected to the input of the transparency filter.

2. The earphone of claim 1, further comprising:

an adaptive filter provided in the shell, wherein an input end of the adaptive filter is connected to the output end of the fixed filter, and an output end of the adaptive filter is connected to the input end of the transparency filter.

3. An earphone control method applied to an earphone of claim 1, comprising:

obtaining a collection signal picked up by the feedback microphone, and a first source signal of the speaker during a sound pickup phase of the feedback microphone;

generating an echo cancellation signal through the fixed filter according to the first source signal;

determining a transparency audio signal based on the collection signal and the echo cancellation signal; and determining a second source signal based on the transparency audio signal and a music signal to be played, and controlling the speaker to play audio based on the second source signal.

4. The earphone control method of claim 3, wherein the echo cancellation signal is an inverse signal of the first source signal; or the echo cancellation signal is a signal formed by attenuating and inverting the first source signal.

5. The earphone control method of claim 3, wherein the determining the transparency audio signal based on the collection signal and the echo cancellation signal comprises:

superimposing the collection signal and the echo cancellation signal to obtain a first superposition signal; and amplifying the first superposition signal through the transparency filter to obtain the transparency audio signal.

6. The earphone control method of claim 3, wherein the earphone further comprises an adaptive filter, and the determining the transparency audio signal based on the collection signal and the echo cancellation signal comprises:

compensating the echo cancellation signal through the adaptive filter to obtain a correction signal;

superimposing the collection signal and the correction signal to obtain a second superposition signal; and amplifying the second superposition signal through the transparency filter to obtain the transparency audio signal.

7. The earphone control method of claim 6, wherein the compensating the echo cancellation signal through the adaptive filter to obtain the correction signal comprises:

calculating a correlation between the first source signal and the collection signal;

in response to that the correlation is greater than a preset threshold, adjusting a transfer function of the adaptive filter; and compensating the echo cancellation signal according to an adjusted transfer function to obtain the correction signal.

8. The earphone control method of claim 7, wherein after the calculating the correlation between the first source signal and the collection signal, the method further comprises:

in response to that the correlation is less than or equal to the preset threshold, compensating the echo cancellation signal according to the transfer function of the adaptive filter to obtain the correction signal.

9. The earphone control method of claim 3, wherein before the obtaining the collection signal picked up by the feedback microphone and the first source signal of the speaker during the sound pickup phase of the feedback microphone, the method further comprises:

infeeding a first frequency sweep signal to the speaker and obtaining a first feedback signal collected by the feedback microphone; and determining a transfer function of the fixed filter according to the first frequency sweep signal and the first feedback signal.

10. The earphone control method of claim 6, before the obtaining the collection signal picked up by the feedback microphone and the first source signal of the speaker during the sound pickup phase of the feedback microphone, the method further comprises:

infeeding a second sweep signal to the speaker and obtaining a second feedback signal collected by the feedback microphone;

calculating a test transfer function according to the second frequency sweep signal and the second feedback signal; and determining a transfer function of the adaptive filter based on a difference between the test transfer function and a transfer function of the fixed filter.

* * * * *